(12) United States Patent
Bartel et al.

(10) Patent No.: US 9,463,405 B2
(45) Date of Patent: Oct. 11, 2016

(54) FILTER ELEMENT AND FILTER ASSEMBLY

(71) Applicant: MANN+HUMMEL GMBH, Ludwigsburg (DE)

(72) Inventors: Frank Bartel, Dingolfing (DE); Marcel Holzwarth, Ludwigsburg (DE); Matthias Weller, Leutenbach (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/528,998

(22) Filed: Oct. 30, 2014

(65) Prior Publication Data
US 2015/0113931 A1 Apr. 30, 2015

(30) Foreign Application Priority Data
Oct. 30, 2013 (DE) .................. 10 2013 018 202

(51) Int. Cl.
*B01D 46/00* (2006.01)
*B01D 46/24* (2006.01)

(52) U.S. Cl.
CPC ....... *B01D 46/0005* (2013.01); *B01D 46/2411* (2013.01); *B01D 46/2414* (2013.01); *B01D 2265/021* (2013.01)

(58) Field of Classification Search
CPC .......... B01D 46/0005; B01D 46/2411; B01D 46/2414; B01D 2265/021
See application file for complete search history.

(56) References Cited

U.S. PATENT DOCUMENTS

| | | | | |
|---|---|---|---|---|
| 4,065,276 A * | 12/1977 | Nakaya | ............. | B01D 46/2403 181/229 |
| 4,135,899 A * | 1/1979 | Gauer | ................ | B01D 46/0024 210/338 |
| 4,304,580 A * | 12/1981 | Gehl | .................. | B01D 46/0004 210/338 |
| 4,482,367 A * | 11/1984 | Howeth | ............ | B01D 46/0005 406/172 |
| 4,507,203 A * | 3/1985 | Johnston | ................ | B01D 29/15 210/445 |
| 4,758,256 A * | 7/1988 | Machado | ........... | B01D 46/0005 210/232 |
| 6,569,219 B1* | 5/2003 | Connor | ............. | B01D 46/2414 55/490 |
| 2004/0134171 A1* | 7/2004 | Scott et al. | ..................... | 55/482 |
| 2009/0049814 A1* | 2/2009 | Baseotto et al. | ................ | 55/482 |
| 2009/0094951 A1* | 4/2009 | Baseotto et al. | ................ | 55/498 |
| 2009/0217632 A1* | 9/2009 | Coulonvaux et al. | .......... | 55/359 |
| 2010/0000414 A1* | 1/2010 | Williams | ........... | B01D 46/2414 96/226 |
| 2012/0247340 A1 | 10/2012 | Williams | | |
| 2012/0317943 A1* | 12/2012 | Kaufmann et al. | ............. | 55/492 |
| 2013/0263744 A1* | 10/2013 | Osendorf et al. | ............... | 96/380 |
| 2014/0033668 A1 | 2/2014 | Kleynen | | |
| 2014/0165834 A1* | 6/2014 | Kaufmann et al. | ............. | 95/273 |

FOREIGN PATENT DOCUMENTS

DE 202008010504 U1 12/2009

\* cited by examiner

*Primary Examiner* — Amber R Orlando
*Assistant Examiner* — Britanny Precht
(74) *Attorney, Agent, or Firm* — James Hasselbeck

(57) ABSTRACT

A filter element has a filter medium with a first end and a second end in an axial direction of the filter medium. A first end disk is connected to the first end and has an outflow opening. A second end disk is connected to the second end and has an engaging section, wherein the engaging section engages a counter engaging section of a filter housing of the filter element such that the filter element is received, secured against rotation, in the filter housing. The second end disk is provided with an aperture.

10 Claims, 3 Drawing Sheets

FILTER ELEMENT AND FILTER ASSEMBLY

BACKGROUND OF THE INVENTION

The present invention concerns a filter element. Moreover, the invention concerns a filter assembly with such a filter element.

Known filter elements are formed, for example, of endless folded bellows that are positioned between two end disks. In this context, a star-shaped folded filter body in the form of a cylinder or cone is produced and the base surface and top surface of the cylinder or cone closed off by the end disks. The fluid to be filtered, for example, air, passes through the filter body into the filter element and exits, filtered, from the filter element through an opening provided in one of the end disks.

WO 2009/014982 A1 discloses an air filter assembly comprising a filter housing and an air filter element that is positioned in the filter housing. The air filter element comprises a first end disk with an outflow opening and a second closed end disk with an outwardly positioned engaging section. The second end disk, in contrast to the first end disk, is closed off fluid-tightly. The engaging section is configured to engage with form fit a corresponding counter engaging section of a housing cover of the filter housing so that the filter element housing is secured against rotation relative to the filter.

In view of this background, the present invention has the object to provide an improved filter element.

SUMMARY OF THE INVENTION

This object is solved by a filter element with a first end disk, a second end disk, and a filter medium arranged between the end disks. The first end disk comprises an outflow opening. The second end disk comprises an engaging section that is configured to engage in such a way a counter engaging section of a filter housing of the air filter that the air filter element is received in the filter housing so as to be secured against rotation. In this context, the second end disk has an aperture.

The filter element is in particular an air filter element that is suitable for filtering combustion air of an internal combustion engine. The aperture connects in particular a raw air side of the filter element with a clean air side thereof. Since the aperture is provided in the second end disk, generation of underpressure between the second end disk and a filter housing cover of the filter housing is prevented. In this way, the filter housing cover can be removed easily from a filter housing body of the filter housing and the filter element exchanged. Moreover, end disk material can be saved by providing the bore (aperture) so that a cost reduction is achieved. The filter element may be suitable for filtering gases, such as air, or operating medium liquids, such as water, oil, or fuel, for example, diesel fuel or gasoline. In particular, the filter element is used in devices on land, water, or air. For example, the filter element can be used in motor vehicles, trucks, construction vehicles, watercraft, rail vehicles, or aircraft.

In embodiments of the filter element, the engaging section surrounds the aperture radially. Preferably, the aperture is positioned centrally in the engaging section. Alternatively, the aperture can be arranged adjacent to the engaging section. Moreover, in the second end disk several apertures can be provided. The engaging section extends preferably out of the second end disk away from the filter medium.

In further embodiments of the filter element, the first end disk and/or the second end disk are manufactured at least partially of an elastic material, for example, polyurethane material. The polyurethane material is in particular elastically deformable. In this way, an excellent sealing action of the engaging section relative to the counter engaging section is ensured. The polyurethane material is preferably cast onto the filter medium by means of an inexpensive casting mold. The use of polyurethane enables therefore the elimination of a cost-intensive injection molding tool.

In further embodiments of the filter element, the engaging section is configured to seal the filter element axially and/or radially relative to the filter housing.

In the axial fluid-tight sealing action, the engaging section is compressed in a longitudinal direction of the filter element. In this way, the filter element is secured axially in the filter housing so that an increased vibration stability and thus a reduced noise emission can be achieved. Alternatively or additionally, the engaging section can be configured to seal the air filter element radially fluid-tightly relative to the filter housing. In this way, a particularly good sealing action of the engaging section relative to the counter engaging section is achieved.

In embodiments of the filter element, the engaging section comprises a star-shaped geometry corresponding with the counter engaging section. The star-shaped geometry enables a particularly good form fit between the engaging section and the counter engaging section. Alternatively, the engaging section can have a circular, elastically deformable geometry.

In embodiments of the filter element, the engaging section is elastically deformable. In this way, a particularly good sealing action of the engaging section relative to the counter engaging section is achieved.

Moreover, a filter assembly with such a filter element and a filter housing receiving the filter element is proposed. The filter housing comprises a filter housing body and a filter housing cover that closes off the filter housing body. The filter assembly is in particular an air filter assembly. The filter housing cover is preferably configured to be removable from the filter housing body. For this purpose, quick release fasteners can be provided on the filter housing.

In a variant of the filter assembly, the counter engaging section of the filter housing is provided on the filter housing cover. The filter housing cover is preferably at least partially manufactured of a plastic material.

In a further variant of the filter assembly, the engaging section of the second end disk of the filter element seals relative to the counter engaging section of the filter housing in axial direction. Additionally or alternatively, the engaging section can seal radially relative to the counter engaging section. In this way, a particularly good sealing action is achieved.

In embodiments of the filter assembly, the engaging section of the second end disk of the filter element seals a raw side of the filter element relative to a clean side of the filter element. In this way, no contaminated fluid from the raw side can reach the clean side. The raw side is in particular a raw air side, the clean side is in particular a clean air side.

Further possible implementations of the invention comprise also combinations, not explicitly mentioned, of features or method steps mentioned above or in the following with respect to the embodiments. In this context, a person of skill in the art will also add individual aspects as improvements or supplements to the respective basic form of the invention.

Further configurations of the invention are subject matter of the dependent claims as well as of the embodiments of the invention described in the following. In the following, the invention will be explained in more detail with the aid of embodiments with reference to the attached Figures.

BRIEF DESCRIPTION OF THE DRAWINGS

In the Figures, same or functionally the same elements, inasmuch as nothing is indicated differently, are provided with the same reference characters.

DESCRIPTION OF PREFERRED EMBODIMENTS

Figure 1:
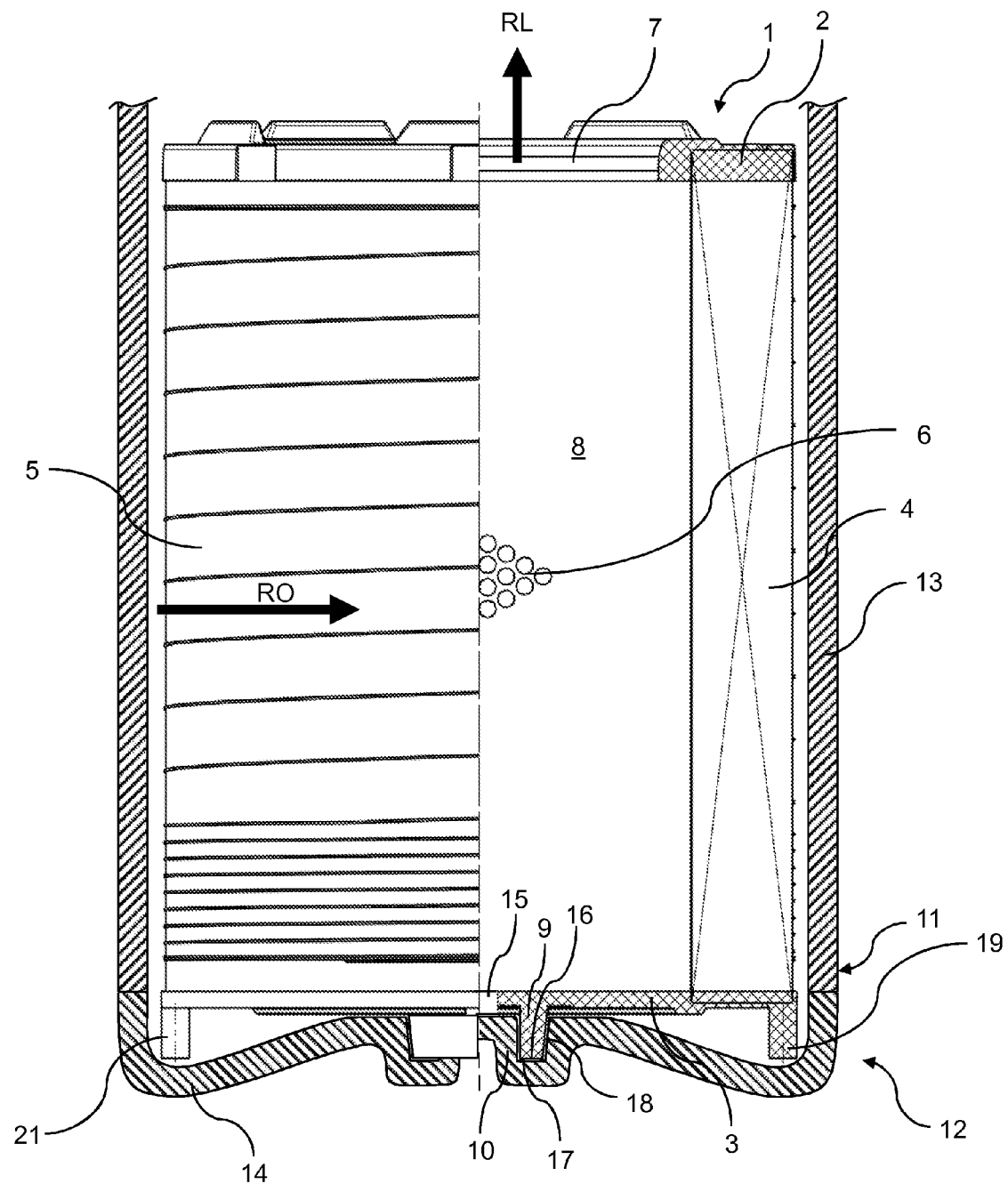
FIG. 1 shows a schematic partially sectioned side view of an embodiment of an air filter assembly.
Figure 2:
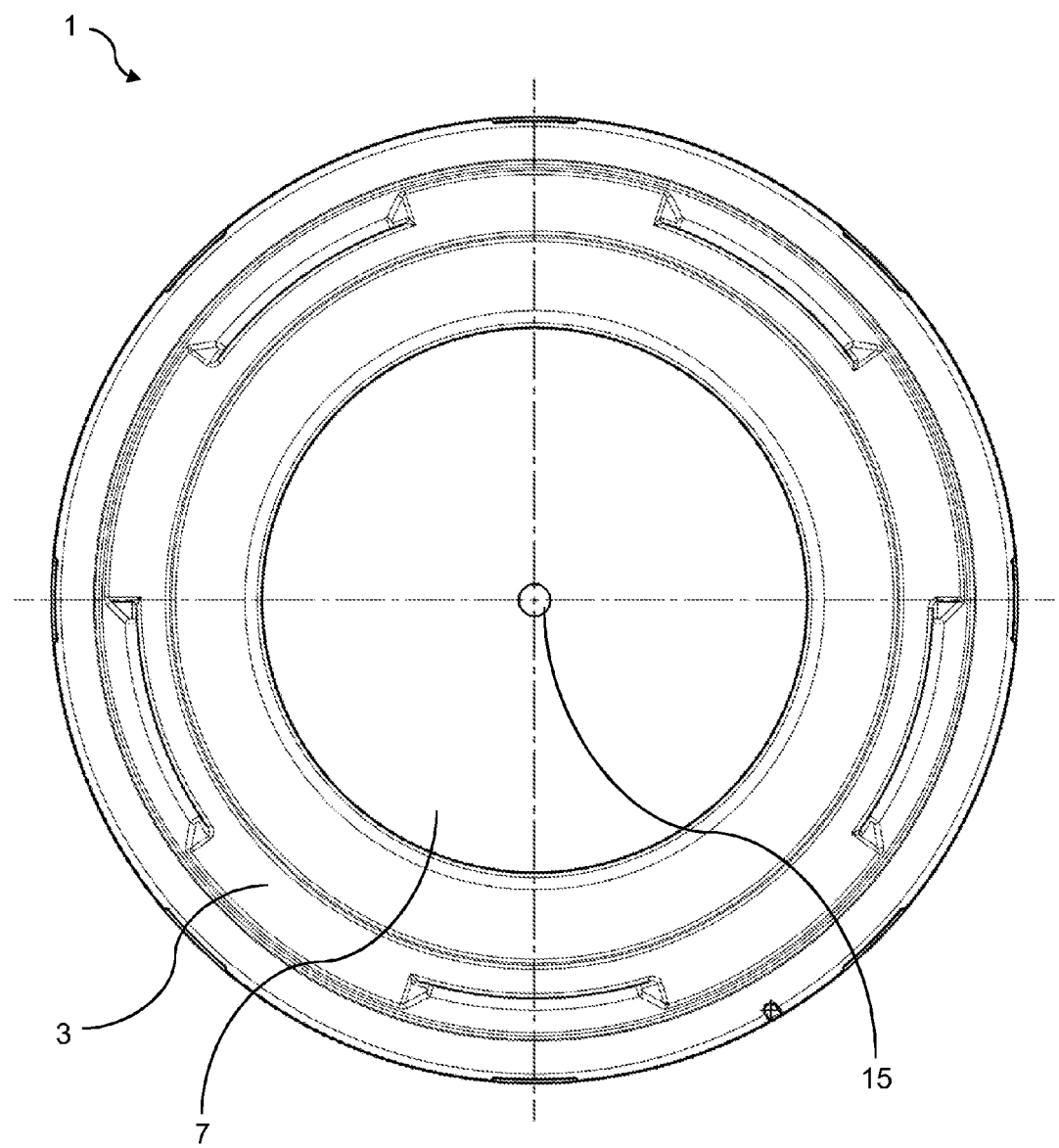
FIG. 2 shows a schematic plan view of an embodiment of an air filter element in the air filter assembly according to FIG. 1.
Figure 3:
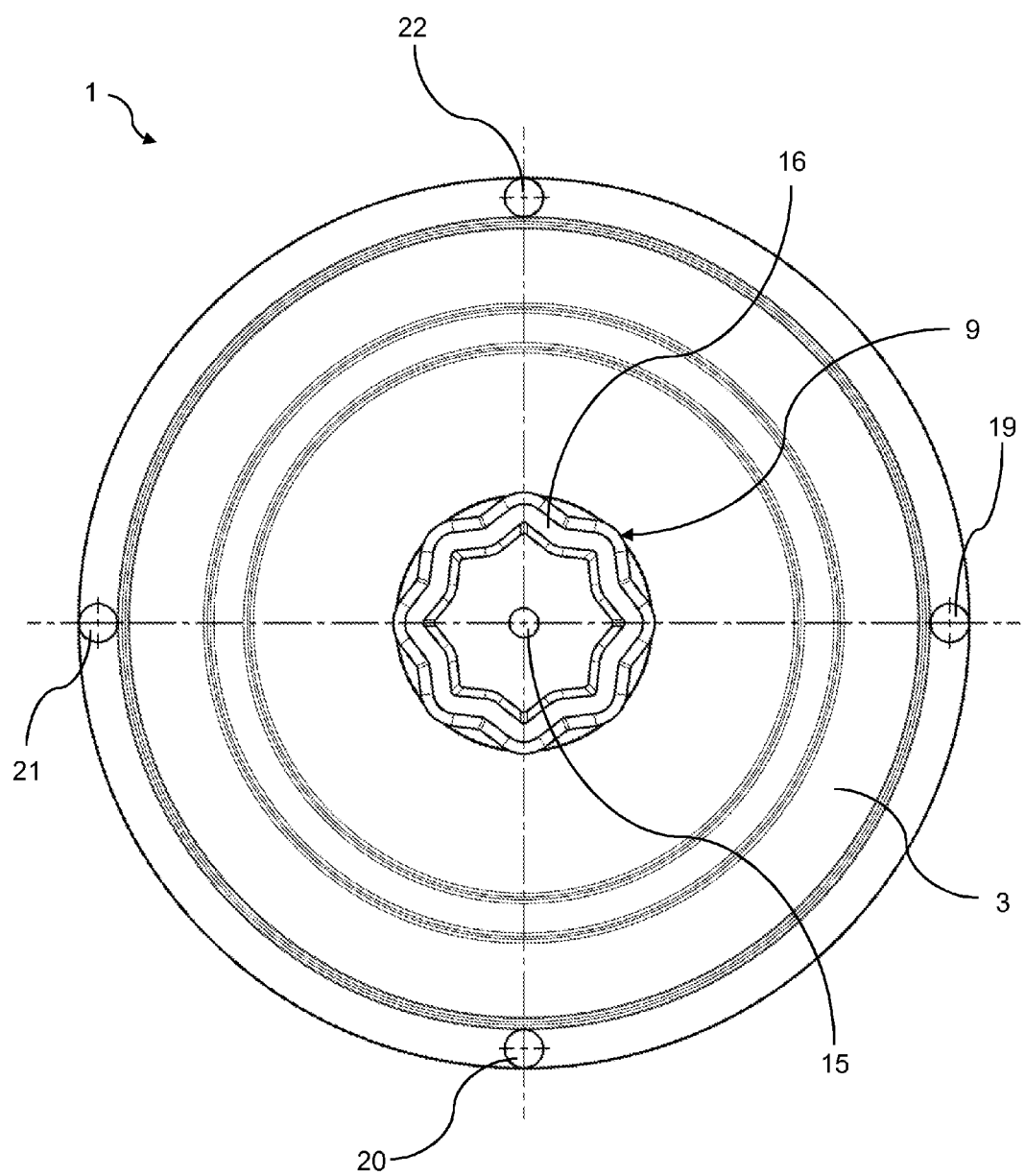
FIG. 3 is a schematic bottom view of the embodiment of the air filter element according to FIG. 2.

FIG. 1 shows a schematic partially sectioned side view of an embodiment of a filter assembly with a filter element, in particular an air filter element 1. FIG. 2 shows a schematic plan view of the embodiment of the air filter element 1 according to FIG. 1. FIG. 3 shows a schematic bottom view of the embodiment of the air filter element 1 according to FIG. 1. In the following, reference is being had simultaneously to FIGS. 1 to 3.

The filter element can be suitable for filtering air, oil, or fuel, such as diesel fuel or gasoline. In particular, the filter element is used in motor vehicles, trucks, construction vehicles, watercraft, rail vehicles, or aircraft. The air filter element 1 is particularly suitable for filtering combustion air of an internal combustion engine.

The schematically illustrated air filter element 1 comprises a first upper end disk 2 and a second lower end disk 3. Between the two end disks 2, 3 a filter medium 4 is provided. The end disks 2, 3, or at least one of the two end disks 2, 3, can be cast on, injection-molded, glued on, welded thereto, or connected in other ways fluid-tightly to the filter medium 4. Preferably, the end disks 2, 3, are manufactured of a polyurethane material and cast onto the ends of the filter medium 4. For this purpose, instead of a cost-intensive injection molding tool for plastic material, an inexpensive casting mold can be used into which the polyurethane material is cast pressureless for formation of the end disks 2, 3.

Alternatively, the end disks 2, 3 can be injection-molded onto the filter medium 4 by an injection molding method. The ends of the filter medium 4 are preferably embedded in the end disks 2, 3. This means that the end disks 2, 3 can be cast on or injection-molded onto the filter medium 4 such that the latter at least partially projects into the end disks 2, 3.

The filter medium 4 can be a filter body of flat or zigzag-shaped folded filter material. The zigzag-shaped filter material forms the filter medium 4 as a star-shaped endless folded bellows which forms substantially a cylinder surface. The filter medium 4 can be surrounded on the exterior by a net 5, in particular a plastic net. The net 5 can catch, for example, coarse dirt particles such as leaves or grass. Moreover, the net 5 protects the filter medium 4 from damage upon exchange of the filter element 1. The filter medium 4 can moreover be supported internally by a fluid-permeable support structure 6. The support structure 6 can be tubular. Preferably, the support structure 6 is grid-shaped. The support structure 6 can prevent collapse of the filter medium 4.

Preferably, at least one of the end disks 2, 3 has an outflow opening 7 that is in particularly centrally arranged. From the outflow opening 7, purified air can flow out of the air filter element 1.

The air filter element 1 has a raw air side RO and a clean air side RL. The fluid to be purified, for example, air, passes from the raw air side RO through the filter medium 4 into an interior 8 of the air filter element 1 that is delimited by the support structure 6 whereby the fluid to be purified is filtered by the filter medium 4. In this context, the support structure 6 supports the filter medium 4 in such a way that it does not collapse. From the interior 8, the purified fluid is discharged in the direction of the clean air side RL through the outlet opening 7 out of the air filter element 1. Preferably, the outflow opening 7 is provided on the first end disk 2.

The second end disk 3 comprises preferably an engaging section 9 that is configured to engage a counter engaging section 10 of a filter housing 11 of the air filter element 1 in such a way that the air filter element 1 is received, secured against rotation, in the filter housing 11. The air filter element 1 and the filter housing 11 form a filter assembly, in particular an air filter assembly 12. The engaging section 9 projects from the end disk 3 in outward direction.

The filter housing 11 comprises a filter housing body 13 and a filter housing cover 14 that fluid-tightly closes off the filter housing body 13. The counter engaging section 10 of the filter housing 11 is preferably provided on the filter housing cover 14. The filter housing 11 is preferably manufactured of a plastic material. For example, the filter housing body 13 and the filter housing cover 14 are injection-molded plastic parts. Between the filter housing cover 14 and the filter housing body 13, a sealing device can be arranged so that the filter housing cover 14 seals fluid-tightly relative to the filter housing body 13.

Preferably, the second end disk 3 of the air filter element 1 comprises an aperture 15. Preferably, the engaging section 9 surrounds the aperture 15 radially. Alternatively, the aperture 15 can be arranged adjacent to the engaging section 9. Several apertures 15 may be provided. The engaging section 9 has a star-shaped geometry, in particular in a plan view according to FIG. 3 showing a bottom view of the filter element 1. The star-shaped geometry of the engaging section 9 is preferably embodied so as to correspond to or match a star-shaped geometry of the counter engaging section 10. In particular, the aperture 15 connects the clean air side RL of the air filter element 1 with the raw air side RO. The engaging section 9 is in particular elastically deformable. The engaging section 9 engages with form fit the counter engaging section 10 so that the air filter element 1 is secured against rotation relative to the filter housing 11. The engaging section 9, instead of having a star-shaped geometry, can also have, for example, a circular, elastically deformable geometry that adjusts to the star-shaped counter engaging section 10.

In particular, the engaging section 9 is manufactured of an elastically deformable material such as polyurethane. The engaging section 9 is configured to seal the air filter element 1 axially relative to the filter housing 11. For this purpose, an end face 16 of the engaging section 9 is pressed against a sealing surface 17 of the filter housing cover 14, in particular of the counter engaging section 10. In this context, the engaging section 9 is preferably elastically deformed.

Alternatively or additionally, the engaging section 9 can radially seal relative to the filter housing cover 14 by means of a lateral outer surface 18.

The air filter element 1 can comprise several support legs 19 to 22 that extend as projections out of the end disk 3 away from the filter medium 4. The number of supports legs 19 to 22 is discretionary. For example, four support legs 19 to 22 are provided. In particular, the support legs 19 to 22 are uniformly distributed about a circumference of the end disk 3. The support legs 19 to 22 are preferably cylindrical. The support legs 19 to 22 are contacting preferably internally the filter housing cover 14 and prevent tilting of the filter element 1 in the filter housing 11. Moreover, they enable an anti-rotation positioning of the filter element in the filter housing 11.

By means of the engaging section 9, the filter element 1 is sealed relative to the filter housing cover 14 so that the raw air side RO is separated from the clean air side RL of the air filter element 1. Since by means of the aperture 15 a pressure compensation can be realized between the interior 8 of the air filter element 1 and the filter housing cover 14, the generation of underpressure between the engaging section 9 and the filter housing cover 14 is prevented. Accordingly, removal of the filter housing cover 14 from the filter housing body 13 for exchanging the air filter element 1 is significantly simplified.

While specific embodiments of the invention have been shown and described in detail to illustrate the inventive principles, it will be understood that the invention may be embodied otherwise without departing from such principles.

What is claimed is:

1. A filter element comprising:
a filter medium comprising a first end and a second end in an axial direction of the filter medium;
a first end disk connected to the first end and comprising an outflow opening;
a second end disk of an elastic material, the second end disk connected to the second end and comprising:
an aperture arranged at a central portion of the second end disk, the aperture extending completely through the elastic material of the second end disk, the aperture fluidically connecting an interior of the filter element to an exterior of the filter element through the second end disk;
an axially outwardly projecting seal of deformable elastic material for sealing, formed on and projecting axially outwardly away from an outer side of the second end disk, the axially outwardly projecting seal of elastic material arranged at the central portion of the second end disk adjacent to the aperture, and circumferentially surrounding the aperture radially;
wherein the axially outwardly projecting seal has an axial sealing surface spaced axially outwardly away from the second end disk;
wherein the axially outwardly projecting seal has a shaped geometry forming an engaging section arranged axially outwardly away from the second end disk,
wherein the engaging section is configured to engage a counter engaging section of a filter housing of the filter element such that the filter element is received, secured against rotation, in the filter housing;
wherein, the aperture fluidically connects an interior of the filter element to an exterior of the filter element through the second end disk.

2. The filter element according to claim 1, wherein the first end disk is comprised at least partially of an elastic material.

3. The filter element according to claim 2, wherein the elastic material of the first end disk is a polyurethane material.

4. The filter element according to claim 1, wherein the elastic material of the second end disk and the axially outwardly proiectinq seal of the second end disk is a polyurethane material.

5. The filter element according to claim 1, wherein the engaging section is configured to seal the filter element relative to the filter housing axially, radially, or axially and radially.

6. The filter element according to claim 1, wherein the engaging section has a star-shaped geometry corresponding to a star-shaped geometry of the counter engaging section.

7. A filter assembly comprising:
a filter housing comprising a filter housing body and a filter housing cover closing off the filter housing body;
a filter element comprising:
a filter medium, comprising
a first end and a second end in an axial direction of the filter medium;
a first end disk connected to the first end and comprising an outflow opening;
a second end disk of an elastic material, the second end disk connected to the second end and comprising:
an aperture arranged at a central portion of the second end disk, the aperture extending completely through the elastic material of the second end disk, the aperture fluidically connecting an interior of the filter element to an exterior of the filter element through the second end disk;
an axially outwardly projecting seal of deformable elastic material, formed on and projecting axially outwardly away from an outer side of the second end disk, the axially outwardly projecting seal of elastic material arranged at the central portion of the second end disk adjacent to the aperture, and circumferentially surrounding the aperture radially;
wherein the axially outwardly projecting seal has a shaped geometry forming an engaging section arranged axially outwardly away from the second end disk;
wherein the filter element is arranged in the filter housing and the engaging section engages a counter engaging section of the filter housing such that the filter element is secured against rotation in the filter housing.

8. The filter assembly according to claim 7, wherein the counter engaging section is provided on the filter housing cover.

9. The filter assembly according to claim 7, wherein the engaging section of the second end disk fluid-tightly seals relative to the counter engaging section of the filter housing axially, radially, or axially and radially.

10. The filter assembly according to claim 7, wherein the filter assembly is an air filter assembly and the filter element is an air filter element,
wherein the engaging section of the second end disk seals a raw air side of the air filter element relative to a clean air side of the air filter element.

* * * * *